Figure 1:
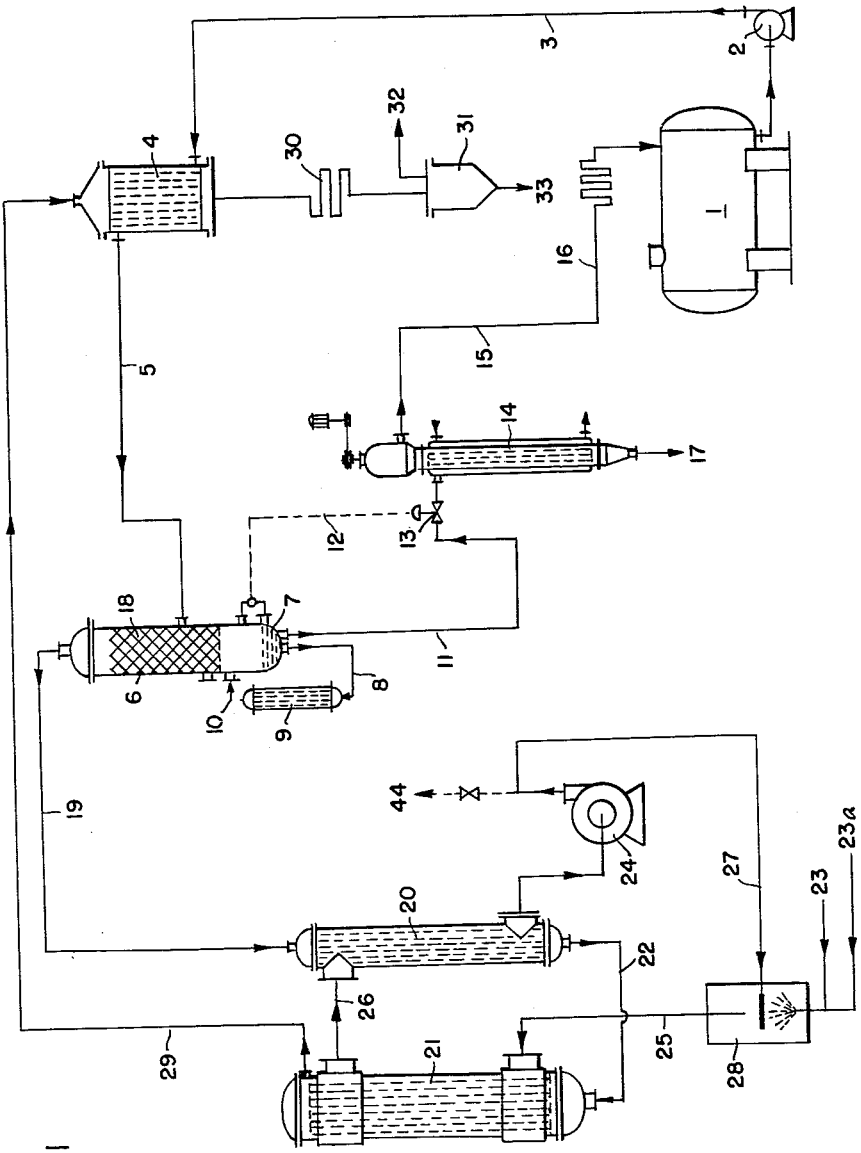

Sept. 15, 1964 G. POEHLER ET AL 3,149,166
PROCESS FOR THE PRODUCTION OF PURE CYCLOHEXANONE
Filed Dec. 27, 1960 2 Sheets-Sheet 1

INVENTORS:
GUENTHER POEHLER
ANTON WEGERICH
HELMUT GIEHNE
OTTO GOEHRE

ATT'YS

Sept. 15, 1964    G. POEHLER ET AL    3,149,166
PROCESS FOR THE PRODUCTION OF PURE CYCLOHEXANONE
Filed Dec. 27, 1960    2 Sheets-Sheet 2

INVENTORS:
GUENTHER POEHLER
ANTON WEGERICH
HELMUT GIEHNE
OTTO GOEHRE

BY Maryall, Johnston,
Cook & Root

ATT'YS

United States Patent Office 3,149,166
Patented Sept. 15, 1964

3,149,166
PROCESS FOR THE PRODUCTION OF
PURE CYCLOHEXANONE
Guenter Poehler, Ludwigshafen (Rhine), Anton Wegerich, Limburgerhof, Hellmut Giehne, Ludwigshafen (Rhine), and Otto Goehre, Heidelberg, Germany, assignors to Badische Anilin- & Soda-Fabrik Aktiengesellschaft, Ludwigshafen (Rhine), Germany
Filed Dec. 27, 1960, Ser. No. 78,470
Claims priority, application Germany Dec. 28, 1959
6 Claims. (Cl. 260—586)

This invention relates to an improved process for the production of pure cyclohexanone from crude cyclohexanol by dehydrogenation in the presence of a catalyst.

Various methods are known for the production of crude cyclohexanol, for example oxidation of cyclohexane with air to a mixture consisting of cyclohexanol and cyclohexanone; hydrogenation and hydrolysis of aniline, hydrogenation of nitrobenzene and subsequent hydrolysis, crude cyclohexanols containing cyclic amines being obtained; or hydrogenation of phenol to cyclohexanol. Crude cyclohexanols which have been prepared by one of these methods or another known method can be dehydrogenated in one or more stages to cyclohexanone in the presence of suitable catalysts, if desired with an addition of steam, especially in the case of cyclohexanol containing amines.

In the known dehydrogenation processes the crude cyclohexanol is vaporized and led in the form of vapor over the dehydrogenation catalyst. In the usual vaporization, considerable amounts of high boiling constituents of the crude cyclohexanol remain in the vaporizer because the byproducts contained in the crude cyclohexanol enter into condensation reactions. Further loss occurs by deposition of solids on the dehydrogenation catalysts. The catalysts become inactive and operation must therefore be discontinued at short intervals. Moreover, the cyclohexanone obtained in this way is insufficiently pure to be used as initial material for the production of caprolactam.

It is an object of the present invention to provide a process according to which a pure cyclohexanone can be prepared by dehydrogenation of crude cyclohexanol in the presence of a catalyst. The cyclohexanone can then be used directly as starting material for the production of cyclohexanone oxime and caprolactam.

Another object of the invention is to provide a process according to which pure cyclohexanone, suitable for the production of caprolactam, can be prepared from crude cyclohexanol in a continuous dehydrogenation process, the activity of the dehydrogenation catalyst being maintained for long periods.

A further object of the invention is to provide a process in which a smaller vaporization residue from the crude cyclohexanol remains than in the process hitherto known.

These and other objects of the invention are achieved by supplying the reaction products obtainable by a usual process for the production of crude cyclohexanol to a vaporization zone. The vaporization zone is maintained at 140° to 170° C., the pressure being substantially the vapor pressure of cyclohexanol at these temperatures, i.e. about 0.5 to 1.5 atmospheres, and the crude cyclohexanol is extensively vaporized in this zone. The liquid residue from this vaporization is then supplied to a second vaporization zone which is maintained at a higher temperature and/or at a lower pressure than the first vaporization zone. The initial material as vaporized as far as possible in this second vaporization zone. The vaporous constituents from the second vaporization are returned, advantageously after condensation, to the first vaporization zone. The vaporized constituents from the first vaporization zone are heated to 250° to 400° C., especially 250° to 350° C., and are then led at a speed of 50 cm./second to 100 cm./second over the dehydrogenating catalyst, the residence period being 4 to 12 seconds. The catalyst used may consist of a heavy metal of groups IB, IIB, VIA and VIII of the periodic system of an oxide or carbonate thereof and is heated by a heating means at a temperature of 250° to 450° C. The vapors are condensed and the cyclohexanone is distilled in the usual manner after separation from the aqueous phase.

In general, catalyst temperatures up to 350° C. are sufficient. When using zinc catalysts, however, catalyst temperatures between 350° and 450° C. are necessary.

The term "crude cyclohexanol" means reaction mixtures such as are formed in the oxidation of cyclohexane with air, which in addition to cyclohexanol contain some cyclohexanone, or such as are formed by hydrogenation of phenol, or such as are obtained by hydrogenation of nitrobenzene and subsequent hydrolysis or hydrogenation and hydrolysis of aniline, which contain cyclohexylamine and other cyclic amines in addition to cyclohexanol. The crude cyclohexanol should contain at least 70% by weight of cyclohexanol.

The crude cyclohexanol is preferably preheated and supplied to a first vaporizer where at least 80%, but not more than 96%, thereof is vaporized, vaporization being carried out at a temperature of between 140° and 170° C. Various vaporizers may be used, for example tube vaporizers, circulation vaporizers, or descending stream vaporizers. It is especially advantageous to use a circulation vaporizer. This comprises a tube vaporizer which is combined with a distillation column in the following manner: the bottoms of the column are supplied to the tube vaporizer, heated therein and the resultant mixture of vapor and liquid is supplied to the column at about the middle. The vapors leave at the top of the column and the liquid runs back into the bottom of the column. In the vaporization of crude cyclohexanols, the temperature of the bottoms of the column is kept at 160° to 180° C. Part of the liquid, about 1 to 20%, is supplied from the bottoms or from the circulation to a second vaporizer. Another vaporizer which may advantageously be used in the first stage is a descending stream vaporizer in which the starting material (crude cyclohexanol) flows through the tubes of a vertical tube nest heated at 140° to 170° C., at least 80% being vaporized. The non-vaporized liquid is supplied to a second vaporizer but part thereof may also be returned to the descending stream vaporizer. It is possible to convert as much as 90 to 95% into the vapor phase in the first vaporizer.

An advantageous embodiment of the invention comprises mixing the crude cyclohexanol with about the same amount by weight of steam before it enters the first vaporizer.

The liquid withdrawn from the first vaporizer is supplied to a second vaporizer. As the second vaporizer, various types of vaporizer may be used. However, falling-film evaporators are especially suitable in which a thin film of liquid flows over the vaporizing surface. If in this second vaporizer the pressure is the same as in the first vaporizer, the temperature should be a few degrees, preferably 10° to about 20° C., higher than in the first vaporizer, so that complete separation takes place into vaporizable constituents and a small non-vaporizable residue. If the pressure in the second vaporizer is lower than the pressure in the first vaporizer, e.g., 0.1 to 0.7 atmosphere, however, the temperature may be the same or even lower than in the first vaporizer. The vaporized fraction is supplied to the first vaporizer either in vapor form or, more advantageously, in the condensed state, advantageously together with the initial crude cyclohexanol.

The vapors leaving the first vaporizer are heated, if desired together with steam, in one or more heat-exchangers by means of the hot vapors coming from the dehydrogenation vessel to a temperature between 250° and 400° C. and led over the dehydrogenation catalyst.

As the dehydrogenation catalysts there are used the heavy metals, usually employed for this purpose, of groups IB, IIB, VIA and VIII of the periodic system in the form of elements, oxides or carbonates or mixtures thereof. Examples of members of these groups are copper, zinc, nickel, platinum, chromium oxide, iron oxide and zinc oxide. The catalytically active substance may be used as such, but is advantageously applied to carriers. As carriers, for example argillaceous earth, titanium dioxide, magnesia, cerium oxide, diatomaceous earth, silicates or mixtures thereof are suitable. The carriers may be pretreated with chlorine, bromine, iodine or fluorine or hydrogen halide. The total catalyst, i.e., the catalyst plus the carrier, usually contains about 3 to 20%, preferably 5 to 15%, of active substance. The catalyst is preferably used in the form of pieces, pills or granules. The catalyst used in the instant process is well known in the art and the selection of a particular catalyst is not considered to form part of the subject invention.

The temperature in the catalyst region is critical. The catalyst is kept by external heating at 250° to 450° C. It is advantageous to use heating gases having a temperature of 450° to 500° C. The temperature difference within the catalyst chamber should not be too great, for example not more than 50° C. Since the gases flowing past have a considerable speed and moreover dehydrogenation proceeds with consumption of heat, the catalyst may be excessively cooled at points far away from the heating elements of the heating means. This may be avoided by arranging the catalyst within a zone of 5 to 6 cm. around the heating element. If, for example, the catalyst is arranged in externally heated tubes, the diameter of the tubes should be less than 12 to 15 cm., preferably 7 to 10 cm. If the catalyst is heated by means of a system of tube nests or heating coils, the free space between the individual heating tubes or plates should be about 8 to 20, especially 9 to 15 cm. Other means may, however, be employed to maintain the temperature in the catalyst region as uniform as possible. The catalyst chamber may also be subdivided one or more times, dehydrogenation then taking place in a plurality of stages.

The crude cyclohexanol vapor, especially when it contains amines, is advantageously led together with about an equal weight to double its weight of steam at a velocity of at least 50 cm./second, advantageously at 60 to 100 cm./second, through the catalyst chamber. The residence period of the crude cyclohexanol in the vaporization zone should be between about 4 and 12 seconds, preferably between 6 and 10 seconds. In other words, the volumetric speeds should be between about 300 and 900 liters of gas and vapor per liter of catalyst per hour.

The residence period is the period in which the crude cyclohexanol is in contact with the catalyst. It can be calculated from the hourly amount of vapor passed through the reaction chamber.

The gases and vapors are then passed through a heat exchanger where they are cooled and condensed. It is advantageous at the same time to heat the initial materials in this heat exchanger. The condensed product, if desired after separation of the aqueous phase, is worked up to pure cyclohexanone by distillation.

In order to achieve especially long operating periods with one catalyst filling it is advantageous, when using a fresh catalyst filling, to carry out dehydrogenation at the lower temperature limit, to check conversion continually by removing samples for analysis, and gradually to increase the temperature as the conversion at the catalyst diminishes.

By the two-stage vaporization of the crude cyclohexanol, the non-vaporizable residue remains extremely small and the unavoidable side reactions, especially of extraneous compounds, such as cyclohexylamine, present in the crude cyclohexanol, are substantially repressed. On the other hand, at the said velocities at the catalyst, dehydrogenation is carried out with very good yields and there is practically no deposition on the catalyst which interferes with its activity. Surprisingly, by the combination of these two features a cyclohexanone is obtained which, after a simple distillation, is suitable for the production of caprolactam without purification. An advantage of the process is that the catalyst has a considerably longer life than in the conventional methods. Moreover, a considerable improvement in the space/time yields is achieved by working according to the new process.

The following examples will further illustrate this invention but the invention is not restricted to these examples. Example 1 is given with reference to FIGURE 1 and Example 2 with reference to FIGURE 2 of the accompanying drawings which are diagrammatic representations of apparatus according to this invention.

*Example 1*

Cyclohexanol is separated by distillation from an oxidation mixture obtained by oxidation of cyclohexane. 2000 kilograms per hour of this product which contains about 95 percent per weight of cyclohexanol are supplied from a storage tank 1 by means of a pump 2 through a pipe 3 to a heat exchanger 4 in which it is heated to 160° C. by means of the hot reaction products led through a pipe 29 from a tubular reactor 21. It then passes through a pipe 5 into a column 6 provided with Raschig rings 18. About 80% vaporizes, while the remaining part collects at the bottom 7 of the column. The liquid level of the bottoms is shown by an automatic level indicator 12 and kept constant by a control valve 13. Part of the bottoms pass through a pipe 8 through a preheater 9 in which they are heated to the boiling point of cyclohexanol. At a pressure of about 0.5 atmosphere gage prevailing in the column, the temperature is 173° C. The vapor and liquid pass through a pipe 10 back into the column 6. Another part of the bottoms flows through a pipe 11 into a falling film evaporator 14 where the product is heated to 175° C. and the high boiling substances are separated from the vaporous cyclohexanol. The falling film evaporator is operated at normal pressure, while the circulation vaporizer is under a pressure of about 0.5 atmosphere gage by reason of the pressure drop in the catalyst chamber and in the other parts of the apparatus. The vapors pass through a pipe 15 into a condenser 16, from which the condensate flows back into the storage tank 1. 6 kilograms per hour of high boiling substances are withdrawn at the lower end of the falling-film evaporator 14 through a pipe 17.

The vapors from the column 6 pass through a pipe 19 into a heat exchanger 20 which is heated with hot gases from the tubular reactor 21. The cyclohexanol heated to 250° C. passes through a pipe 22 into the tubular reactor 21. The tubular reactor 21 consists of about 80 tubes with a diameter of 10 cm. and a length of 6 meters. The distance between the tubes is 10 mm. The tubes containing the catalyst are heated externally with 20,000 cubic meters per hour of heating gas having an initial temperature of 400° C. The vaporized cyclohexanol is led at a temperature at 250° C. and a speed of 60 cm. per second through the tubes which are filled with a shaped catalyst consisting of copper applied to pumice. The residence period of the gas at the catalyst is 10 seconds. A circulatory blower 24 sucks the combustion gas from the tubular reactor 21 through a pipe 26 and the heat exchanger 20 and passes it through a pipe 27, a combustion furnace 28 and a pipe 25 back into the tubular reactor 21. Fresh fuel gas and air for combustion pass through pipes 23 and 23a into the combustion furnace. Part of the combustion gas escapes to a smoke stack at 44.

The hot reaction product passes through the pipe 29 from the tubular reactor and gives off its heat in the heat exchanger 4 to the cyclohexanol to be heated up. The residual heat in the reaction product is led away in a water cooler 30. The condensate collects in a separating vessel 31 from which the hydrogen disengaged escapes through a pipe 32. Through a pipe 33 at the bottom of the separating vessel 31, 1936 kilograms per hour of liquid reaction product are withdrawn from which by distillation 1510 kilograms per hour of pure cyclohexanone and 360 kilograms per hour of unchanged cyclohexanol can be recovered.

*Example 2*

Figure 2:
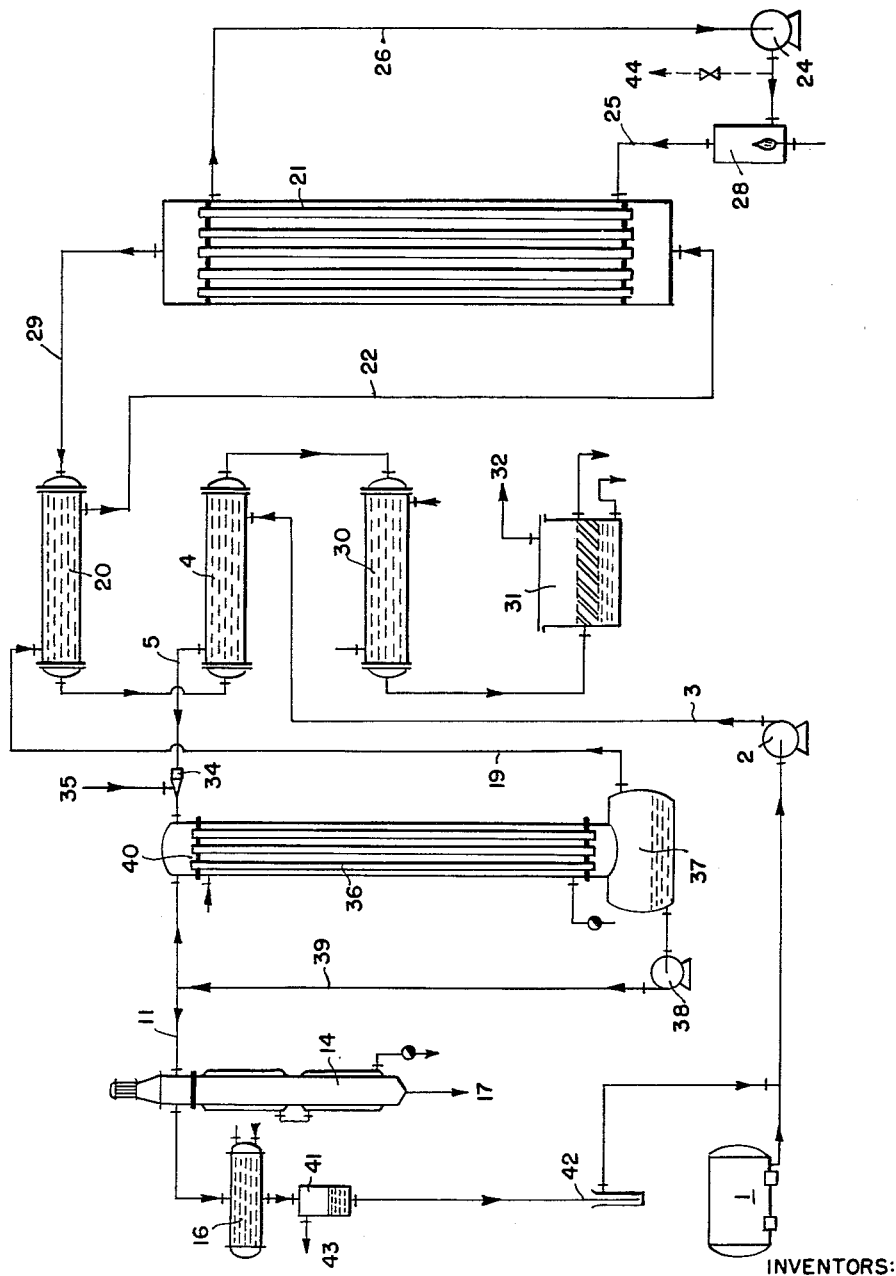

Referring to FIGURE 2, 2000 kilograms per hour of a reaction product formed by hydrogenation of nitrobenzene and subsequent hydrolysis and consisting of 71% of cyclohexanol, 20% of monocyclohexylamine and 9% of dicyclohexylamine are supplied from a storage tank 1 by means of a pump 2 through a pipe 3 to a heat exchanger 4 in which it is preheated to 150° C. Thence the reaction product is supplied through a pipe 5 to a mixer 34 in which it is mixed with 2000 kilograms per hour of steam supplied through a pipe 35. The mixture passes into a descending stream vaporizer 36. The reaction product and the steam at a temperature of 160° C. flow through the tubes heated to 160° C. in a downward direction, 95% of the reaction product being vaporized. At the lower end of the vaporizer, the mixture separates into vaporous and liquid fractions in a separator 37. The liquid fraction is returned by means of a pump 38 through a pipe 39 to the top 40 of the descending stream vaporizer. A liquid level is maintained in the separator 37 by branching off 30 kilograms per hour of the liquid fraction through a pipe 11 and leading it into a falling film evaporator 14 operating at a pressure of 0.5 atmosphere absolute and 160° C. and from which 4 kilograms per hour of pitchy substances are withdrawn at 17 while the vaporizable portion flows through a condenser 16 where it is condensed and collects in a receiver 41. The liquid is taken from the receiver 41 and returned to the pump 2 through a barometric discharge pipe 42. Vacuum is applied at 43. The vacuum is 40 mm. Hg.

The vapor withdrawn from the separator 37 is led through a pipe 19 through a heat exchanger 20 and preheated to 250° C. It then passes through a pipe 22 into a tubular reactor 21. This tubular reactor is constructed as described in Example 1. The tubes of this reactor, 10 cm. in diameter, are filled with a shaped catalyst consisting of iron oxide and copper and are heated externally with combustion gases at a temperature of 400° C. A circulating gas blower 24 sucks the combustion gas from the tubular reactor through a pipe 26 and passes it back to the tubular reactor through a combustion furnace 28 and a pipe 25.

The mixture of cyclohexanol and steam flows at a speed of 60 cm. per second through the parallel tubes filled with catalyst. The residence period at the catalyst is 10 seconds. The reaction mixture leaves the tubular reactor at 300° C. and passes through a pipe 29 through the heat exchangers 20 and 4 into the water cooler 30. The condensate then passes into a separator 31 while the hydrogen formed by the reaction is led away through a pipe 32.

The liquid fraction is separated into an aqueous phase and an oily phase. Cyclohexanol and cyclohexanone are separated from the aqueous phase by azeotropic distillation. The oil obtained is separated together with the oily phase by distillation. 1544 kilograms per hour of cyclohexanone, 300 kilograms per hour of cyclohexanol and 140 kilograms per hour of residue are obtained.

What we claim is:

1. A process for the production of cyclohexanone which comprises: substantially evaporating a crude cyclohexanol, said crude cyclohexanol being obtained by oxidation of cyclohexane with air and separation of the reaction products, in a first vaporization zone maintained at a temperature of 140 to 180° C. and at a pressure of about 0.5 to 1.5 atmospheres absolute; supplying the liquid residue from said first vaporization zone to a second vaporization zone; evaporating the liquid residue from said first vaporization zone in said second vaporization zone; returning the vapors from said second vaporization zone to said first vaporization zone; passing said vapors from the first vaporization zone after preheating to 250° to 350° C. over a catalyst selected from the group consisting of the heavy metals of groups IB, IIB, VIA and VIII of the periodic system, their oxides, carbonates and mixtures thereof with a velocity of from 50 cm./second to 100 cm./second providing a residence period at said catalyst of from 4 to 12 seconds; condensing the vapors having left the catalyst; and isolating the cyclohexanone by distillation.

2. A process for the production of cyclohexanone which comprises: substantially evaporating a crude cyclohexanol, said crude cyclohexanol being obtained by oxidation of cyclohexane with air and separation of the reaction products, in a first vaporization zone maintained at a temperature of 140 to 180° C. and at a pressure of about 0.5 to 1.5 atmospheres absolute; supplying the liquid residue from said first vaporization zone to a second vaporization zone; evaporating the liquid residue from said first vaporization zone in said second vaporization zone; returning the vapors after condensing them from said second vaporization zone to said first vaporization zone; passing said vapors from the first vaporization zone after preheating to 250° to 350° C. over a catalyst selected from the group consisting of the heavy metals of groups IB, IIB, VIA and VIII of the periodic system, their oxides, carbonates and mixtures thereof with a velocity of from 50 cm./second to 100 cm./second providing a residence period at said catalyst of from 4 to 12 seconds; condensing the vapors having left the catalyst; and isolating the cyclohexanone by distillation.

3. A process for the production of cyclohexanone which comprises: substantially evaporating a crude cyclohexanol, said crude cyclohexanol being obtained by oxidation of cyclohexane with air and separation of the reaction products, in a first vaporization zone maintained at a temperature of 140 to 180° C. and at a pressure of about 0.5 to 1.5 atmospheres absolute; supplying the liquid residue from said first vaporization zone to a second vaporization zone; evaporating the liquid residue from said first vaporization zone in said second vaporization zone at the same pressure as in the first vaporization zone but at an about 10° to 20° C. higher temperature; returning the vapors from said second vaporization zone to said first vaporization zone; passing said vapors from the first vaporization zone after preheating to 250° to 350° C. over a catalyst selected from the group consisting of the heavy metals of groups IB, IIB, VIA and VIII of the periodic system, their oxides, carbonates and mixtures thereof with a velocity of from 50 cm./second to 100 cm./second providing a residence period at said catalyst of from 4 to 12 seconds; condensing the vapors having left the catalyst; and isolating the cyclohexanone by distillation.

4. A process for the production of cyclohexanone which comprises: substantially evaporating a crude cyclohexanol, said crude cyclohexanol being obtained by oxidation of cyclohexane with air and separation of the reaction products, in a first vaporization zone maintained at a temperature of 140 to 180° C. and at a pressure of about 0.5 to 1.5 atmospheres absolute; supplying the liquid residue from said first vaporization zone to a second vaporization zone; evaporating the liquid residue from said first vaporization zone in said second vaporization zone at the same temperature as in the first vaporization zone and at a pressure which is lower than the first vaporization zone and in a range of 0.1 to 0.7 atmosphere; returning the vapors from said second vaporization zone to said first vaporization zone; passing said vapors from the first vaporization zone after preheating to 250 to 350° C. over a catalyst selected from the group consisting of the heavy metals of groups IB, IIB, VIA and VIII of the periodic system, their oxides, carbonates and mixtures thereof with a velocity of from 50 cm./second to 100 cm./second providing a residence period at said catalyst of from 4 to 12 seconds; condensing the vapors having left the catalyst; and isolating the cyclohexanone by distillation.

5. A process as claimed in claim 1 wherein the process is carried out in the presence of steam.

6. A process for the production of cyclohexanone which comprises: substantially evaporating a crude cyclohexanol, said crude cyclohexanol being obtained by hydrogenating a compound selected from the group consisting of nitrobenzene and aniline and subsequent hydrolysis, in a first vaporization zone maintained at a temperature of 140° to 180° C. and at a pressure of about 0.5 to 1.5 atmospheres absolute; supplying the liquid residue from said first vaporation zone to a second vaporization zone; evaporating the liquid residue from said first vaporization zone in said second vaporization zone; returning the vapors from said second vaporization zone to said first vaporization zone; passing said vapors from the first vaporization zone after preheating to 250° to 350° C. over a catalyst selected from the group consisting of the heavy metals of groups IB, IIB, VIA and VIII of the periodic system, their oxides, carbonates and mixtures thereof with a velocity of from 50 cm./second to 100 cm./second providing a residence period at said catalyst of from 4 to 12 seconds; each of the preceding steps being carried out in the presence of steam; condensing the vapors having left the catalyst; and isolating the cyclohexanone by distillation.

References Cited in the file of this patent
UNITED STATES PATENTS

| | | |
|---|---|---|
| 1,892,011 | Sandkuhl | Dec. 27, 1932 |
| 2,218,457 | Winans | Oct. 15, 1940 |
| 2,338,445 | Laucht | Jan. 4, 1944 |